UNITED STATES PATENT OFFICE 2,418,628

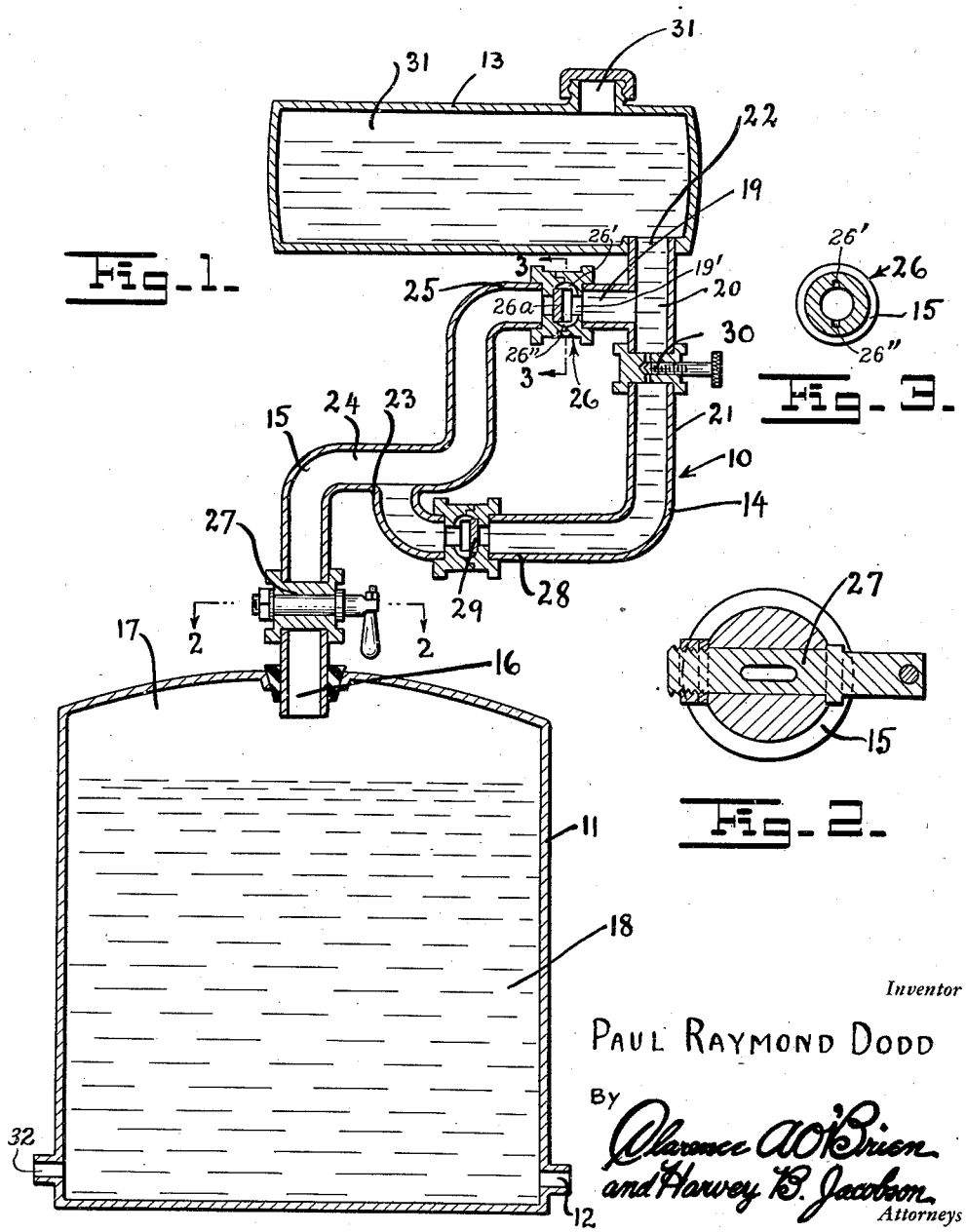

CHLORINATING APPARATUS

Paul Raymond Dodd, Maryville, Tenn., assignor of fifty per cent to I. D. Kenner, Mooresburg, Tenn.

Application December 13, 1944, Serial No. 567,982

4 Claims. (Cl. 210—28)

This invention relates to water purifiers and has for its object to provide an automatically operating water chlorinating apparatus.

Another object of the invention is to provide a chlorine dispensing apparatus actuated entirely by air pressure.

A further object of the invention is to provide a water tank, a chlorine tank mounted thereabove and an intermediate apparatus through which chlorine may be automatically fed to the water in the water-tank when required for chlorinating a fresh supply of water pumped into said tank.

Other features and advantages will become more readily apparent from the following description and the accompanying illustrative drawings in which:

Figure 1 is a vertical sectional view of my device,

Figure 2 is a sectional view taken on line 2—2 of Figure 1, and

Figure 3 is a similar view taken on line 3—3 of Figure 1.

In the accompanying drawings and following specification like reference characters indicate like parts in which 10, refers to my invention which comprises a water-tank 11, with which water is fed under pressure through an inlet port 12, from a well or other supply source. Mounted above tank 11, is a chlorine containing tank 13, and located between said tanks and connecting the same is my chlorine injecting apparatus 14, which consists of a stepped pipe 15, the lower end 16, of which enters the compressed air chamber 17, above the water 18, in tank 11. The upper end 19, of pipe 15, enters into the upper part 20, of a J-shaped pipe 21, the upper terminal 22, of which opens into the chlorine tank 13, and its lower terminal 23, opens into the step 24, of pipe 15.

Located in the upper step 25, of pipe 15, is a check valve 26, normally held closed by pressure maintained in tank 13, and in the pipe 20, but which will open to a greater air pressure in pipe 15, to permit such air to bypass through vents 26' and 26" which enter aperture 19' outwardly of the periphery of valve disk 26a and thence enter tank 13, through port 22, that is when the cut-off valve 27, is open, which valve is located in the lower part of pipe 15. Located in the tail portion 28, of pipe 21, is a check valve 29, similar to valve 26, but so swung as to open through pressure in pipe 21, and tank 13. Also located in pipe 21 is a needle valve 30, to control passage of fluid through said pipe. The cut-off valve is for cutting off flow therethrough when tank 13 is being filled through filling port 31.

In operation, when valve 27 is open, air passes from tank 11, through pipe line 15, through check valve 26, into pipe line 21, above needle valve 30, and thence into chlorine containing tank 13. The check valve allows passage of air in only one direction and this air keeps the pressure in the chlorine containing tank 13. When pressure, for example, is 50 lbs. in tank 11, the pressure in tank 13 is the same. However, when pressure is reduced in tank 11, by drawing off water through port 32, the pressure is then greater in chlorine containing tank 13, which forces the chlorine down through needle valve 30, and on through pipeline 21, check valve 29, pipeline 15, and into tank 11, thus purifying the new supply of water entering tank 11. The needle valve permits adjustment for determining amount of chlorine needed for tank 11.

It is also to be noted that when the water outlet of tank 11 is closed and water is pumped into the tank increasing the pressure therein above that of tank 13, the pressure will be transferred to tank 13, in the aforesaid manner, thus as the pressure is increased in the latter tank the chlorine is forced down through pipe 21, past valve 29, and into pipe 15, and thence down into the tank 11, regardless of air pressure in pipe 15, because the chlorinated fluid is heavier than the air and may follow the pipe down while air pressure is flowing up therethrough.

It is thought that persons skilled in the art to which the invention relates will be able to obtain a clear understanding of the invention after considering the description in connection with the drawings. Therefore, a more lengthy description is regarded as unnecessary.

Having now described my invention, that which I claim as new and desire to procure by Letters Patent is:

1. A water purifying apparatus consisting of a water tank, a chlorine tank located above the water tank, a pipeline connecting said tanks, means whereby compressed air is directed from the water tank to the upper tank and chlorine from the upper tank to the water tank partially through the same pipeline and at the same time, said means including another pipeline connected to the first line at two diverging points, and check valves in said lines operating in opposite directions, and a needle valve in the second line and a cut-off valve in the first line.

2. A water purifying apparatus consisting of a water tank, a chlorine tank located above the water tank, a pipeline connecting said tanks, means whereby compressed air is directed from the water tank to the upper tank and chlorine from the upper tank to the water tank partially through the same pipeline, and at the same time, said means including another pipeline connected to the first line at two diverging points, and check valves in said lines operating in opposite directions.

3. A water purifying apparatus consisting of a water tank, a chlorine tank located above the water tank, a pipeline connecting said tanks, means whereby compressed air is directed from the water tank to the upper tank and chlorine from the upper tank to the water tank partially through the same pipeline, and at the same time, and said means including another pipeline connected to the first line at two diverging points.

4. In a device as described a pair of tanks, a pipe line system for interchange of fluids from each of said tanks to the other, said system being located outwardly of both tanks but connecting the same, said system embracing an air passage pipe and a liquid passage pipe, the latter pipe having connection to the former at two points, and a series of control valves in said system.

PAUL RAYMOND DODD.

REFERENCES CITED

The following references are of record in the file of this patent:

UNITED STATES PATENTS

| Number | Name | Date |
|---|---|---|
| 1,577,157 | Averill | Mar. 16, 1926 |
| 1,855,323 | Sirch | Apr. 26, 1932 |
| 2,064,627 | Paine | Dec. 15, 1936 |
| 2,362,606 | Albertson et al. | Nov. 14, 1944 |
| 545,108 | Reed et al. | Aug. 27, 1895 |
| 2,097,092 | Bachman | Oct. 26, 1937 |
| 552,863 | Bolin | Jan. 7, 1896 |
| 1,680,103 | Hardy | Aug. 7, 1928 |
| 2,243,258 | Munn | May 27, 1941 |
| 2,128,721 | Watts | Aug. 30, 1938 |
| 555,006 | Hill | Feb. 18, 1896 |
| 2,351,579 | Beckman | June 20, 1944 |
| 549,224 | Atkinson | Nov. 5, 1895 |
| 522,532 | Nopper | July 3, 1894 |
| 1,991,235 | True et al. | Feb. 12, 1935 |
| 2,225,087 | Tade | Dec. 17, 1940 |

FOREIGN PATENTS

| Number | Country | Date |
|---|---|---|
| 57,265 | German | June 26, 1891 |